United States Patent [19]

Verhoeckx et al.

[11] 3,757,044

[45] Sept. 4, 1973

[54] VIDEOPHONE SYSTEM

[75] Inventors: Nicolaas Alphonsus Maria Verhoeckx, Eindhoven; Herman Van Der Hoff, Hilversum; Cornelis Henricus Johannes Vos; Johannes Wilhelmus, Coenders, both of Eindhoven, all of Netherlands

[73] Assignee: U.S. Philips Corporation, New York, N.Y.

[22] Filed: Nov. 2, 1971

[21] Appl. No.: 194,816

[30] Foreign Application Priority Data

Nov. 13, 1970 Netherlands .......................... 7016627

[52] U.S. Cl. ......... 178/69.5 TV, 178/5.6, 179/2 TV, 179/15 BS

[51] Int. Cl. ........ H04j 3/06, H04n 5/08, H04n 7/18

[58] Field of Search ...................... 178/5.6, 69.5 TV; 179/2 TU, 15 BS

[56] References Cited

UNITED STATES PATENTS

| | | | |
|---|---|---|---|
| 3,519,736 | 7/1970 | Dorsey | 178/5.6 |
| 3,529,081 | 9/1970 | Rider | 178/5.6 |
| 3,639,838 | 2/1972 | Kuhn | 179/15 BS |

*Primary Examiner*—Howard W. Britton
*Attorney*—Frank R. Trifari

[57] ABSTRACT

In a videophone system sound, video, synchronizing and signalling signals are to be transmitted through a single pair of telephone cables of existing telephone communications. In that case sound, synchronizing and signalling signals are transmitted in a digital form and video signals are transmitted in an analog form. It is then possible to achieve optimum picture quality at the given bandwidth of the existing telephone communications. If for the given bandwidth the video signal were also digitalized, then this would be at the expense of the picture quality. However, it is then necessary to transmit information regarding clock pulses for decoding at the receiver end. These clock pulses must be regenerated at the receiver end for which purpose a synchronizing circuit is provided. To enable this synchronizing circuit to run in or to come into an on-synchronizing state again, information regarding the clock pulses is also transmitted at the transmitter end during at least part of a line scan period namely the part commencing after the beginning of a field flyback period and ending when a field code word is transmitted. This period must be long enough to introduce the direct voltage component lost during transmission and it must be long enough to establish synchronisation because otherwise the field code word cannot be detected in the correct manner. Furthermore means are present at the receiver end (clamping circuit or highpass filter) so as to restore this direct voltage component during the said period of transmitting clockpulse information.

8 Claims, 7 Drawing Figures

Figure 1:
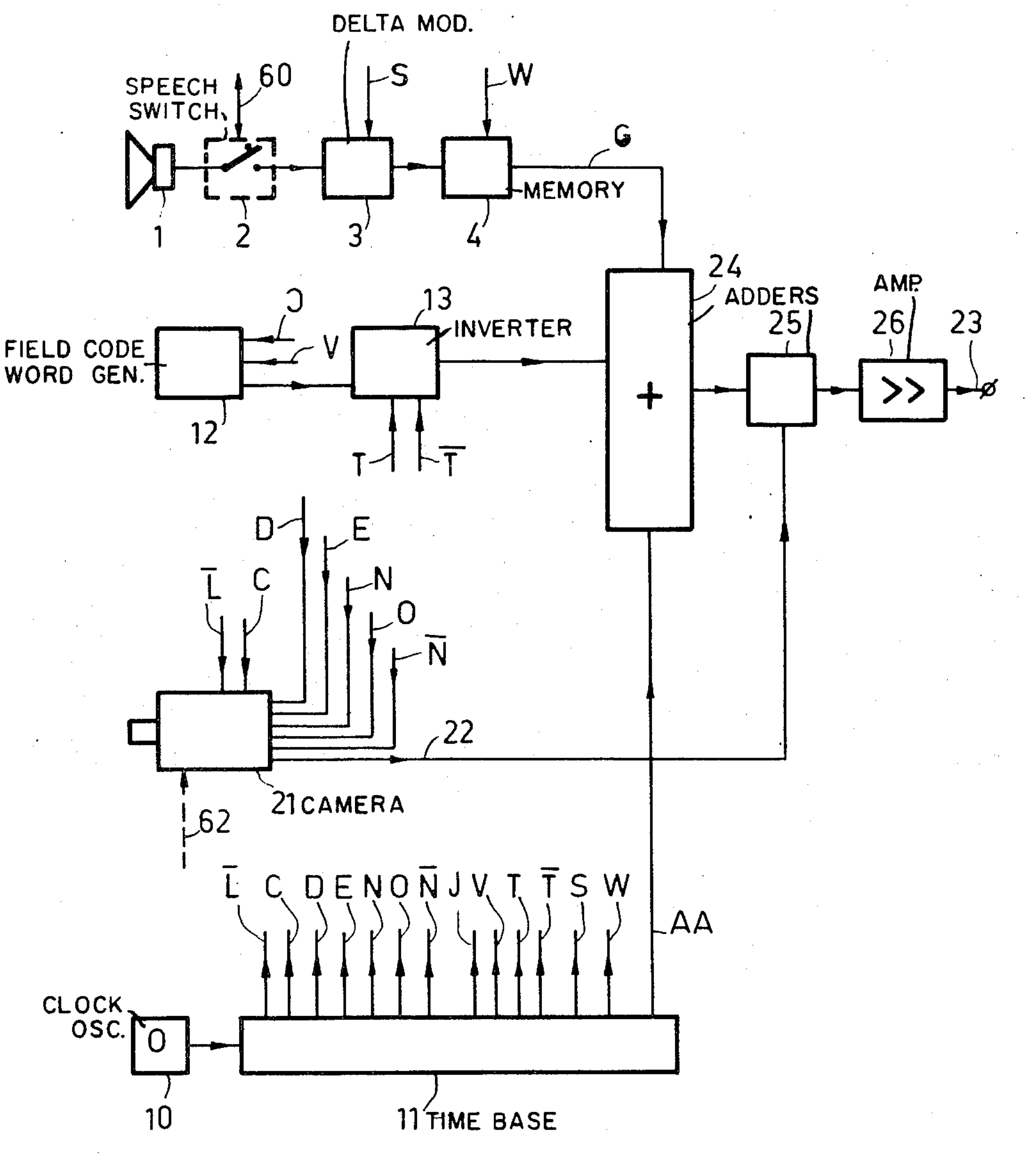

INVENTORS
NICOLAAS A.M. VERHOECKX
HERMAN VAN DER HOFF
CORNELIS H.J. VOS
JOHANNES W. COENDERS
BY
Frank R. Trifari
AGENT INVENTORS
NICOLAAS A.M. VERHOECKX
HERMAN VAN DER HOFF
CORNELIS H.J. VOS
JOHANNES W. COENDERS
BY
AGENT INVENTORS
NICOLAAS A.M. VERHOECKX
HERMAN VAN DER HOFF
CORNELIS H.J. VOS
JOHANNES W. COENDERS
BY
AGENT INVENTORS
NICOLAAS A.M. VERHOECKX
HERMAN VAN DER HOFF
CORNELIS H.J. VOS
JOHANNES W. COENDERS
BY
AGENT INVENTORS
NICOLAAS A.M. VERHOECKX
HERMAN VAN DER HOFF
CORNELIS H.J. VOS
JOHANNES W. COENDERS
BY
AGENT INVENTORS
NICOLAAS A.M. VERHOECKX
HERMAN VAN DER HOFF
CORNELIS H.J. VOS
BY JOHANNES W. COENDERS

AGENT

INVENTORS
NICOLAAS A.M. VERHOECKX
HERMAN VAN DER HOFF
CORNELIS H.J. VOS
JOHANNES W. COENDERS
BY
[signature]
AGENT

VIDEOPHONE SYSTEM

The invention relates to a videophone system comprising at the transmitter end means for generating and transmitting synchronizing signals and video signals and at the receiver end a synchronizing circuit and means for processing and displaying the video signals.

Such a system is known from "Bell Laboratories Record," vol. 47, no. 5 of May-June page 140 left-hand column, subtitle to second Figure. This known system in which both synchronizing and video signals are transmitted in an analog form has advantages as well as drawbacks. The advantage may be explained as follows. When introducing videophone system, existing telephone communications are most preferred as regards the short distances. These are pairs of telephone cables constituting a communication network which may provide the possibility of selecting communications. In fact, it would be a costly matter to provide new telephone cables. The available bandwidth of existing communications is approximately 1 MHz (see page 139 of said Record, table in right-hand column). If the video signal were to be recoded in a digital form, this involves a bit rate of 6.3 Mb/S, i.e. a bandwidth of more than 3 MHz. Consequently, a digitalized video signal cannot be transmitted through existing telephone communications unless loss of image quality is taken into the bargain, which is of course undesirable.

On the other hand the co-transmission of the synchronizing signals in analog form has, for transmission technical reasons, various drawbacks, to wit:

1. The synchronizing signals are located in the so-called blacker-than-black part of the peak-to-peak value of the overall signal and occupy approximately 30 percent of this peak-to-peak value while the video signals occupy the remaining 70 percent. If the synchronizing signals were digitalized, the overall peak-to-peak value could be reduced to 70 percent. In fact, digitalized synchronising pulses may then be located during the line flyback period in that part of the peak-to-peak value which is used for the (analog) video signals during the line scan period. This is possible because in such a system time separation substitutes for amplitude separation. Since the peak-to-peak value may be lower when the information contants remain equal, the requirements imposed of the control of the final stages of the amplifiers used in the system are reduced.

2. A second drawback of a completely analog system is that relatively large amplitudes are required for the synchronizing pulses (see the above-mentioned 30 percent of the overall peak-to-peak value). This involves cross-talk of the synchronizing signals on other telephone cables of the local network. By digitalizing the synchronizing signals the amplitude of the synchronizing signal itself may be reduced considerably so that crosstalk does not occur or hardly ever occurs.

However, in such a system the so-called run-in problem occurs. In fact, in a system in which the video signal is transmitted in analogue form during line and field scan periods, the signal does not contain any information regarding the clock pulses.

In addition the aim in connection with the above-mentioned crosstalk in case of transmission on local telephone cables is to transmit the digitalized synchronizing signal with a much smaller amplitude than the analog video signal. Furthermore the signal looses its direct voltage component when it is transmitted through the pairs of telephone cables and the circuit arrangement must have restored this direct voltage component in the signal in one way or other before synchronisation at the receiver and becomes possible.

In order to ensure running in or restoring to the on-synchronizing state in case of reception of a new signal or in case of the signal running out of synchronisation, the video-phone system according to the invention is characterized in that at least the synchronizing signal is generated and transmitted in a digital form and that the video signal is transmitted in an analogue form, the system furthermore comprising at the transmitter end a master clock pulse generator for generating clock pulses and a code word generator for generating a field code word, the receiver end including a code word detector and a clock pulse generator with the associated clock pulse synchronizing circuit, means being present at the transmitter end so as to enable said synchronizing circuit to run in or to come in the on-synchronizing state, which means cotransmit synchronizing information during at least part of a line scan period commencing after the beginning of a field flyback period and ending when a field code word is generated by the code word generator during said field flyback period, said synchronizing information being transmitted with the overall signal in order to realize synchronisation of the clock pulse generator at the receiver end.

Figure 2:
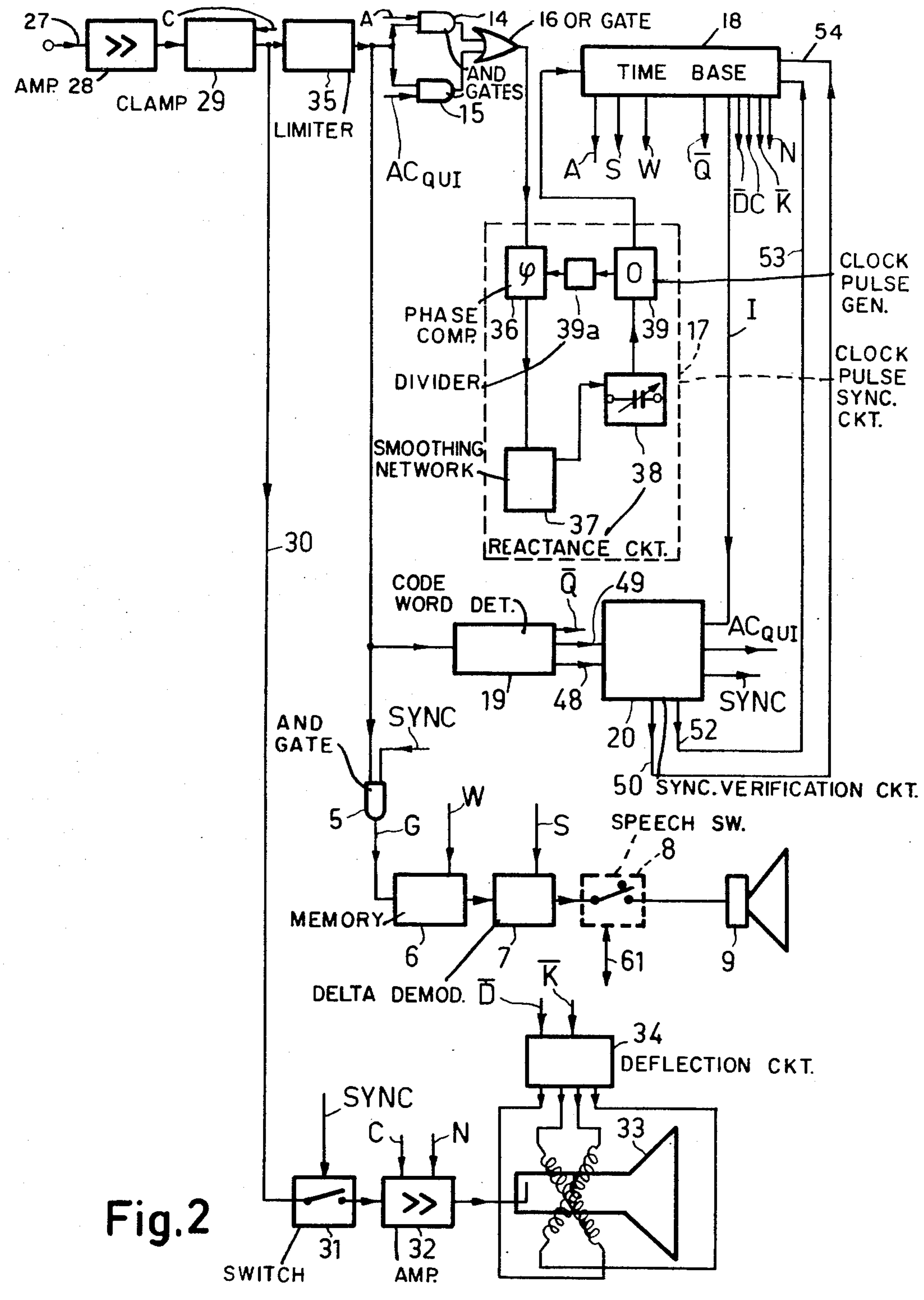
Figure 3:
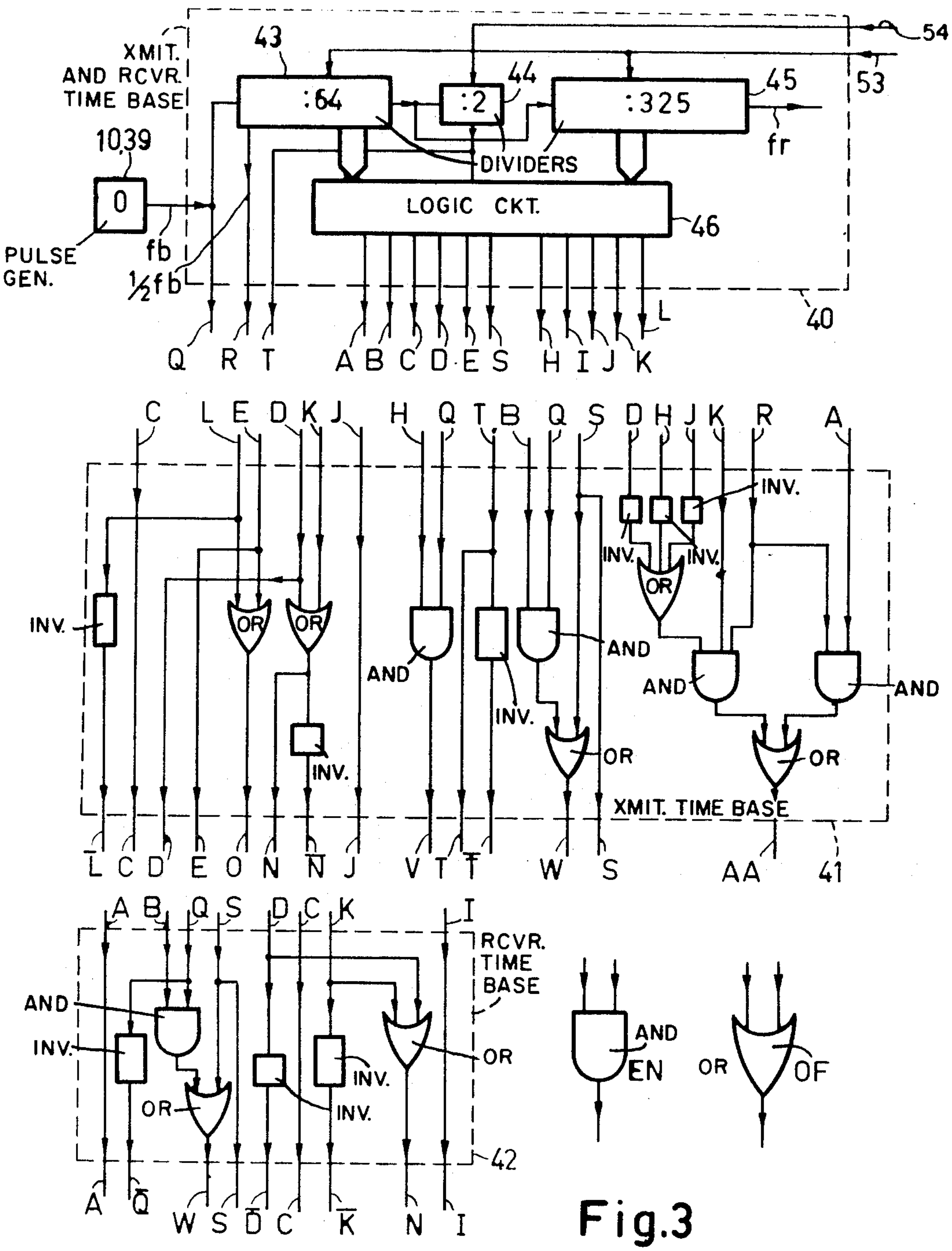
Figure 4:
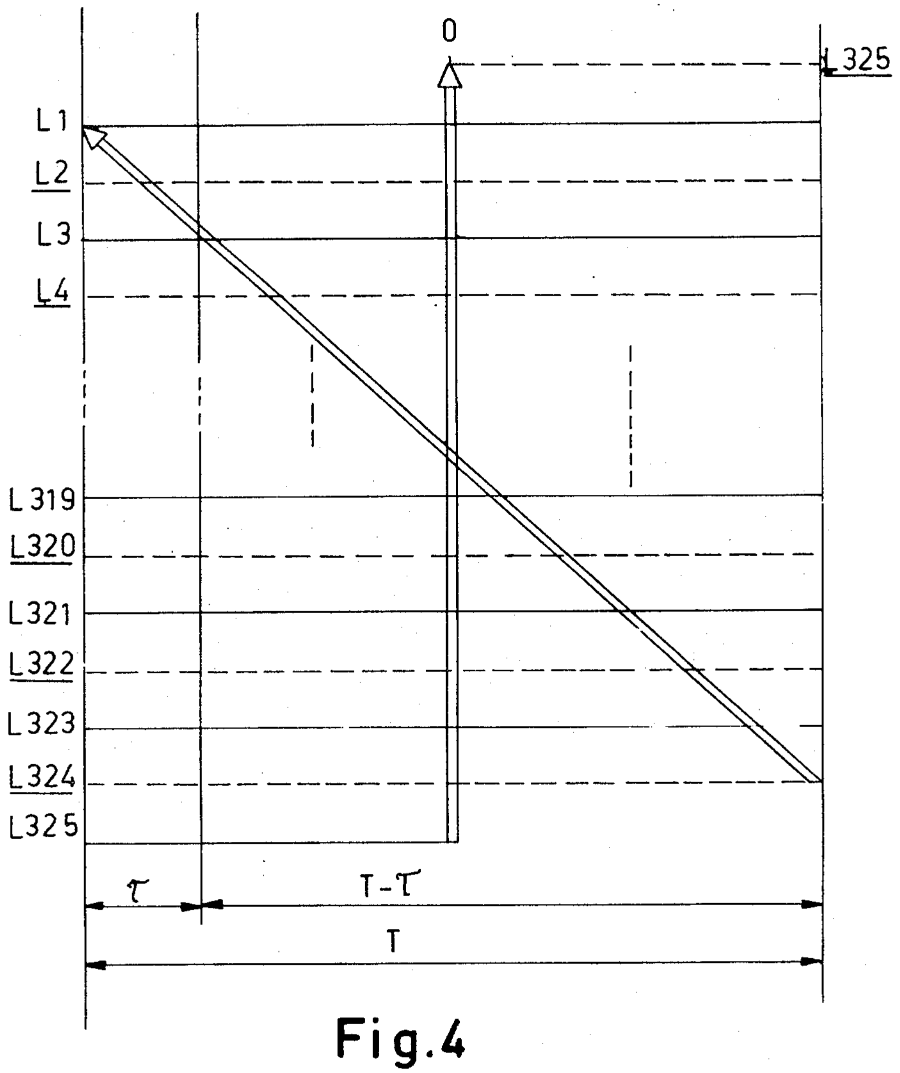
Figure 5:
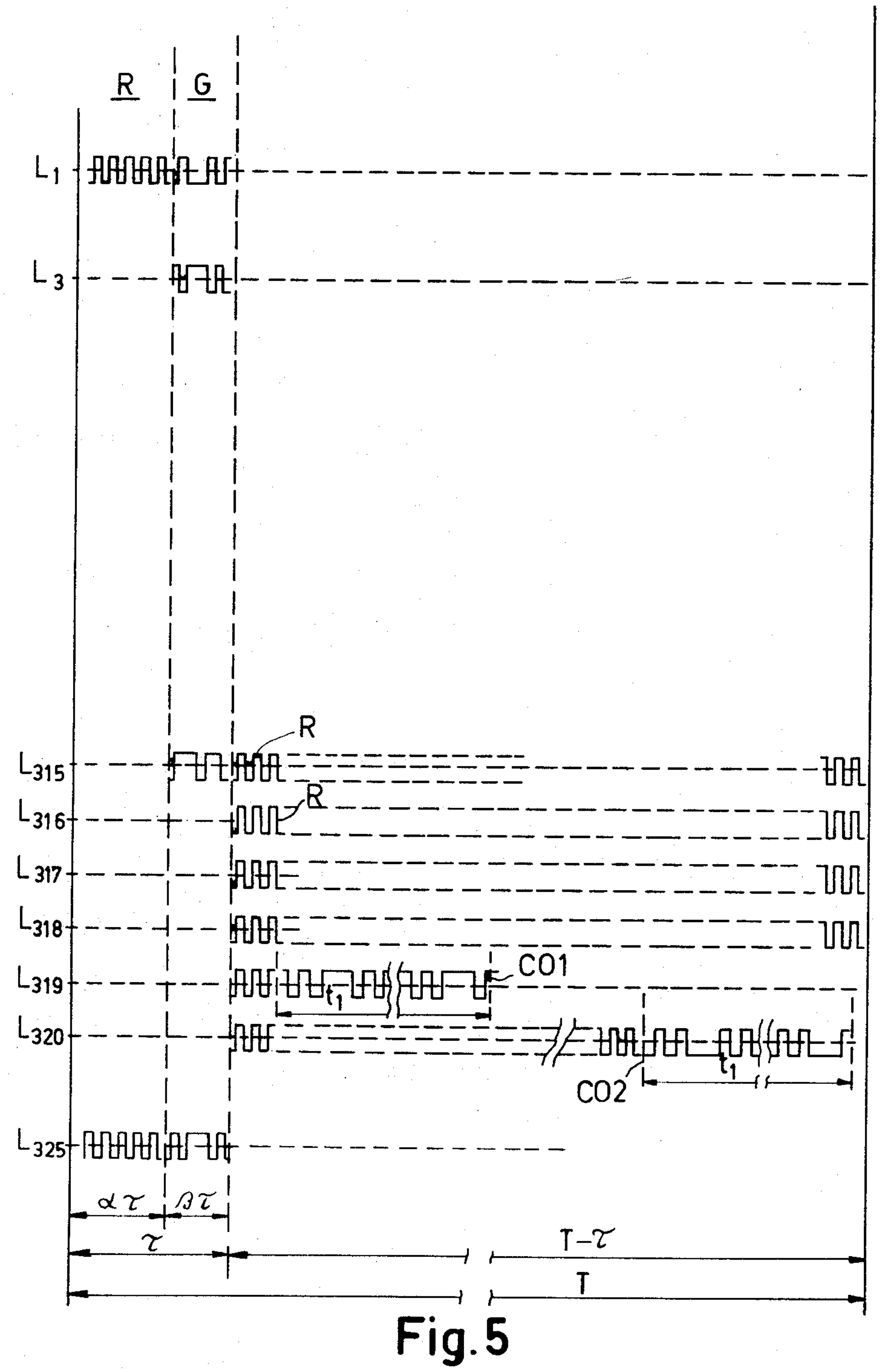
Figure 6:
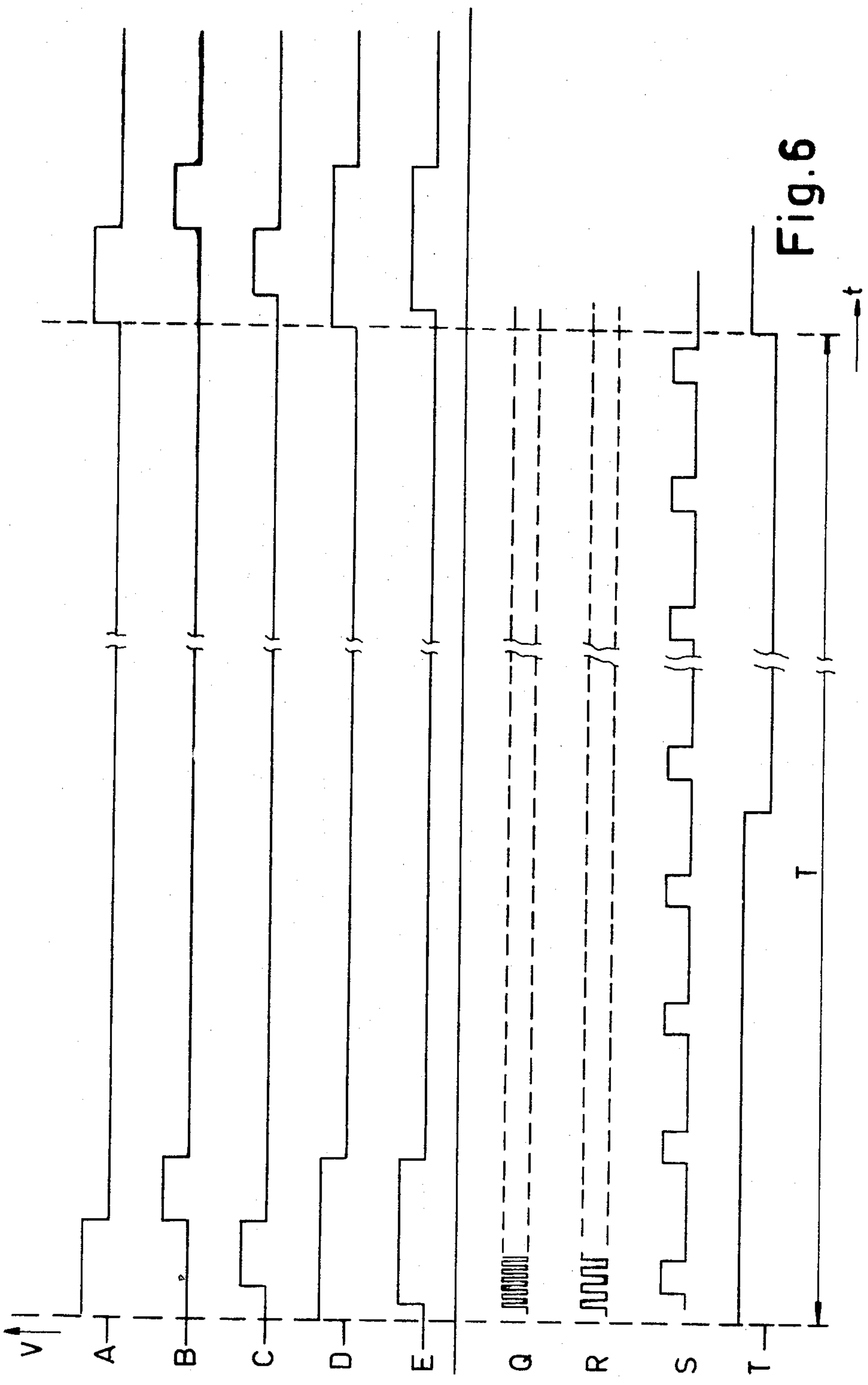
Figure 7:
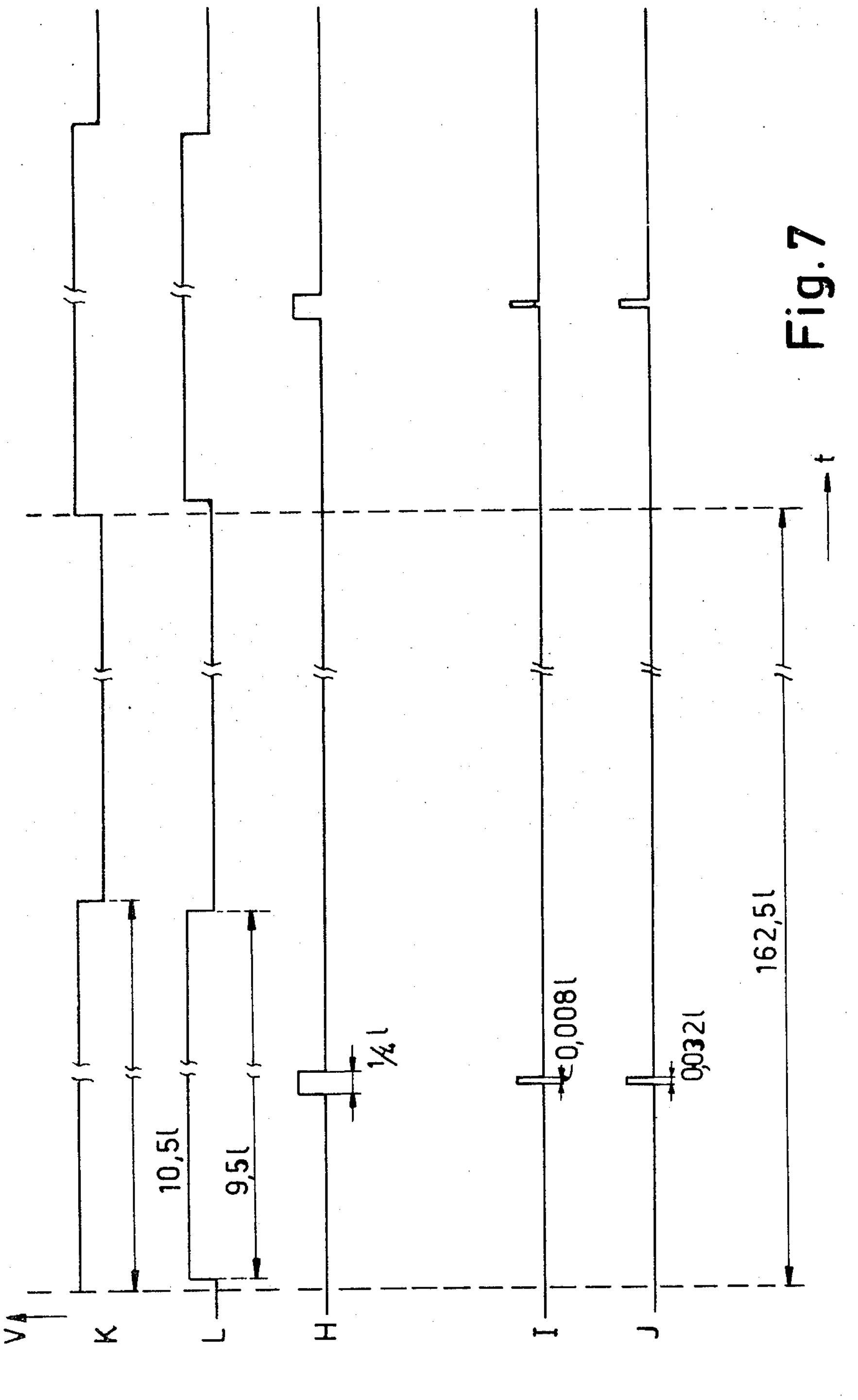

In order that the invention may be readily carried into effect, some embodiments thereof will now be described in detail by way of example with reference to the accompanying diagrammatic drawings in which:

FIG. 1 shows the structure in a block-schematic diagram of the transmitter in a videophone unit, FIG. 2 shows the structure of the receiver in a videophone unit, FIG. 3 shows the time base for generating the various pulsatory signals both for the transmitter and the receiver, FIG. 4 shows the structure of the image as is used for such a videophone system, FIG. 5 is similar to FIG. 4 but also shows the various pulsatory signals which are used in this system, FIG. 6 shows continuously present time base signals of line frequency, and FIG. 7 shows time base signals of field frequency.

It is to be noted that transmitter and receiver will hereinafter be described interchangeably and that each videophone unit comprises both a transmitter and a receiver section according to FIGS. 1 and 2. Generally the transmitter in the videophone unit of the subscriber who calls synchronizes the receiver in the videophone unit of the subscriber called, and conversely. However, to render adjustment or correction of each camera possible at the commencement of and during each communication, the videophone unit includes switches which can connect the time base of its own transmitter to its own receiver section. The camera can then be adjusted in the correct manner so that it is ensured that the image has a sufficient definition and that the camera is directed correctly.

The sound section in the transmitter comprises a microphone 1, a speech switch 2, a delta modulator 3 and a so-called eight-bit buffer memory 4. The corresponding sound section in the receiver comprises an AND-gate 5, an eight-bit buffer memory 6, a delta demodulator 7, a speech switch 8 and a loudspeaker 9.

As will be explained hereinafter the sound section of the transmitter is to cooperate with the sound section of the receiver which is ensured with the aid of the synchronizing system used in this case. As already described in the preamble, clock pulses and signals derived therefrom must be generated by means of the transmitter for the synchronisation of the receiver and for other purposes. This is effected in the transmitter by means of a master clock pulse generator 10 and a time base 11. A field code word generator 12 and an inverter stage 13 are also present at the transmitter end which ensures by means of pulsatory signals T and $\overline{T}$ to be described hereinafter, i.e., the latter signal being logically inverted relative to the first, that during one field the field code word provided by code word generator 12 is passed and that this code word is passed in a logically inverted form during the second field.

The section required for synchronisation at the receiver end which cooperates at the transmitter end with the section described hereinbefore comprises AND-gates 14 and 15, an OR-gate 16, a clock pulse synchronising circuit 17 and a time base 18. Furthermore the synchronisation requires a code word detector 19 and a so-called synchronisation verification circuit 20. The latter may be assumed to be a kind of coincidence stage which will become apparent from the description hereinafter.

The system described is an analog-to-digital system. This means that the sound signal, synchronizing signal and signalling signals are co-transmitted in a digital form in the signal to be transmitted. The Figures do not illustrate the generation and the processing of the signalling signals because these are not essential for the invention. On the other hand the video signals are co-transmitted in an analog form. The latter has been done because the video signals in an analog form already require a rather large bandwidth. As described in the preamble, a maximum video frequency of 1 MHz is considered for the present system because a signal having such a bandwidth can be transmitted through existing pairs of telephone cables with only a few simple additional provisions. On the other hand, if the video signal were also to be transmitted in a digital form, the bandwidth of the actual video signal must be inevitably limited when the phase of 1 MHz for the telephone cables remains the same. This leads to a poorer image quality. However, the system is built up in such a manner that, if desired, the analog-to-digital system which is combined in the first instance can be converted into a completely digital signal without any objection. To this end the video information is only to be recorded from an analog to a digital form because all other information (sound, synchronisation and signalling) is already present in a digital form. It is true that the bandwidth required for transmission is then larger, but this can be technically realized for the transmission between one telephone exchange and the other which transmission is generally effected with the aid of broad-band systems. The present system is therefore quite suitable to transmit the generated signal in an analog-digital form from the transmitter in the videophone unit of the subscriber who calls via already existing communications to the nearest exchange, to convert this signal in this exchange, if desired, into a completely digital signal, to transmit the signal via a broad-band system, to convert the signal in the receiver exchange into an analog-to-digital form while the signal can be transmitted in the latter form from the receiver exchange to the subscriber called, and conversely.

The video signal is generated with the aid of the camera 21. The signal 22 supplied by this camera is an amplitude-varying signal which includes a direct voltage component.

In order to combine all generated signals at the output terminal 23, the transmitter furthermore includes a first adder stage 24 in which exclusively digital signals are added, and a second adder stage 25 which adds digital and analog signals together. The signal thus combined is amplified in the output stage 26 and is electrically balanced relative to earth and subsequently applied to the output terminal 23 to which the outgoing cable pair of the telephone cable is connected.

It is to be noted that an earth lead is not shown in the transmitter nor in the receiver but each transmitter and each receiver includes of course an earth lead.

The videophone signal reaches the subscriber called through the incoming cable pair on input terminal 27, is subsequently amplified and transformed in amplifier 28 into a signal which is asymmetrical relative to earth, and is subsequently applied to a clamping circuit 29 which restores the direct voltage component of the signal lost during transmission and from which the signal is directly applied through the lead 30 to a switch 31. From this switch the signal passes to a video amplifier 32 which applies the analog video signal to the display tube 33. The deflection signals for the display tube 33 are generated in a deflection circuit 34. Of course the display section at the receiver end consisting of the parts 31, 32, 33 and 34 cooperates with the camera 21 at the transmitter end. Therefore the analog video signal is generated and processed through the last-mentioned parts. The digital signals at the receiver end are first of all passed through the limiter 35 and subsequently to the synchronizing and sound section as well as to the signalling section not shown.

It is to be noted that the clock pulse synchronizing circuit 17 itself consists of a phase comparison stage 36, a smoothing network 37, a reactance circuit 38, a clock pulse generator 39 and a two-to-one divider **39*a***.

FIG. 3 shows the time base circuit 11 of the transmitter and the time base circuit 18 of the receiver in greater detail.

Both the time base 11 and the time base 18 actually consist of two parts, one part 40 which is identical for both and a block 41 for the transmitter as well as a block 42 for the receiver. This means that the time base 11 consists of the parts 40 and 41 and the time base 18 consists of the parts 40 and 42.

The part 40 comprises a first divider stage 43 which divides the clock pulse signal received from clock pulse generators 10 and 39 by 64, a second divider stage 44 which divides the signal received from divider stage 43 by 2 and a third divider stage 45 which divides the signal received from divider stage 43 by 325.

FIG. 3 shows for clock 40 that the clock pulse signal has a frequency $f_b$ which is equal to 1.04 MHz, which signal is available at the output Q. Furthermore the frequency one-half $f_b$ is indicated at the output R which implies that the clock frequency at that point is divided by 2. This signal R is the signal which is ultimately passed through the lead and hence the two-to-one divider **39*a* is required at the receiver end so as to divide the pulse signal of frequency $f_b$ generated by generator 39 by 2 so as to be able to compare it with the signal R of frequency one-half $f_b$ received from the transmitter end. Finally the frequency $f_r$ which is the field frequency of 50 Hz is indicated at an output of the stage 45**.

The various outputs of the divider stages 43, 44 and 45 lead to a logical circuit 46 which combines the various signals from these divider stages in known manner to the signals desired at the outputs and shown in FIGS. 6 and 7. This technique which is known per se will not be described but it is sufficient to indicate characters at the inputs of the stage 41 which correspond to the characters at the outputs of the stage 40 to which the respective inputs of the stage 41 are connected. Characters whose significance can be found in the table I below are also indicated at the outputs of the stage 41.

The same applies to the stage 42 which is coupled to the stage 40 in the receiver section.

As will be explained hereinafter the signal R transmitted during the period $\alpha\,\tau$ serves for synchronizing the synchronizing circuit 17 when this circuit is in an on-synchronizing state. This means that for such a state the signal derived from stage 35 passes through the gate 14 which is gated by the signal A derived from time base 18 in such a manner that it passes the signal derived from limiter 35 during the portion $\alpha\,\tau$ of the line flyback period $\tau$. When running in the synchronizing circuit 17 and also for the case where the circuit 17 might be in an off-synchronizing state, it is possible, for example, to transmit the signal R not only during a portion $\alpha\,\tau$ of the line flyback period $\tau$ but also during at least a portion of a line scan period T - $\tau$ occurring in a field flyback period. This is indicated for the odd fields in FIG. 5 for the lines $L_{315}$, $L_{317}$ and $L_{319}$ and for the even fields for the lines $L_{316}$, $L_{318}$ and $L_{320}$. Further-

TABLE I

| Type of signal | Signal indication | Pulse duration (see also Figs. 6 and 7) | Purpose |
|---|---|---|---|
| Line frequency signals $f_h$=8.125 kHz period=123/ $\mu$S=128/bit. | A | 12 bit=$\alpha\tau$ | Clock pulse synchronisation. |
| | B | 8 bit=$\beta\tau$ | Sound transmission. |
| | C | 8 bit= | Clamping pulse. |
| | D | 20 bit=$\tau$ | Video blanking=line flyback. |
| | E | 18 bit= | Camera line blanking. |
| Field frequency signals $f_r$=50 Hz | H | 32 bit=t1 | Position of code word. |
| | I | 1 bit | Verification pulse. |
| | G | 4 bit | Position of signalling. |
| | K | 10.5 line period | Video field blanking=field flyback. |
| | L | 9.5 line period | Camera field blanking. |
| Continuously available signals | Q=1.04 MHz | 50% of period | Clock pulses. |
| | R=520 KHz | 50% of period | Alternating ones and zeros. |
| | S=65 KHz | 25% of period | Sampling frequency for delta modulator and demodulator. |
| | T=8.125 KHz | 50% of period | Auxiliary signal for generating code words. |
| Combined signals | N=D+K | | Overall video blanking. |
| | O=E+L | | Overall camera blanking. |
| | W=B.Q+S | | Clock signal for sound buffer. |
| | V=H.Q | | Clock signal for code word generator. |
| | AA=K.R. ($\overline{D}+\overline{H}+\overline{J}$)+A.R | | All alternating ones and zeros present in a field for the purpose of clock pulse synchronisation. |

The characters used in table I serve both for the indication of the various outputs and inputs and for the indication of the signals occurring at the outputs. For an inverted signal the characters are provided with a stripe notation in the Figures, as is common practice.

FIG. 4 shows the line pattern which is scanned in the camera tube at the transmitter end and in the display tube at the receiver end while assuming a timeless flyback. FIG. 4 shows that the total image consists of 325 lines which are subdivided in two fields of 162.5 lines each. The lines 1, 3, 5 up to and including the first half of line 325 constitutes the odd field while the last part of line 325 and the lines 2, 4 up to and including 324 constitute the even field. As is known this is a 2-to-1 interlacing as is common practice for television techniques. The picture frequency is 25 Hz and therefore the field frequency $f_r$, as indicated, is 50 Hz. This results in a line frequency of 8.125 KHz and hence a line duration of approximately 123 $\mu$sec for which a time $\tau$ which is approximately equal to 20 $\mu$sec. is used for the line flyback. The clock pulse frequency $f_b$ is chosen in the upper part of the transmission band of approximately 1 MHz namely at 128 $x$ 8.125 KHz = 1.04 MHz. In the system used two types of signals are transmitted during the line flyback period $\tau$, i.e., during the portion $\alpha\,\tau \approx$ 12 $\mu$sec signal R is transmitted from which at the receiver end the clock pulse frequency $f_b$ can be recovered in a simple and reliable manner from the clock pulse synchronizing circuit 17.

more FIG. 5 shows that a code word $CO_1$ is transmitted on line $L_{319}$ during a period $t_1$ and a second code word $CO_2$ is transmitted during the line $L_{320}$. These field code words are generated at the transmitter end by the code word generator 12 in known manner and are spaced apart over exactly one field period.

The operation of the synchronisation is as follows. In the first place the run-in problem will be referred to. This run-in is possible because the pulsatory signal R is provided over a comparatively long period after the commencement of a field flyback and before the code word occurs. This is because it must first be ensured that the synchronizing circuit 17 is synchronized in the correct manner so that generator 39 provides clock pulses of the correct frequency before the code words $CO_1$ and $CO_2$ occur. In fact, it is more difficult to recognize this code word as the code word detector 19 receives clock pulses from time base 18 which deviate more in frequency from the frequency $f_b$ at the transmitter end. In addition gate 15 is closed as from the first time of detection of a field code word and gate 14 is keyed by signal A. When at that instant of the first detection of the field code word generator 39 is not exactly synchronized there is the risk that this keying by signal A is not effected in the correct manner and that for the subsequent field flyback period the verification pulse I from time base 18 and detection of the next incoming field code word does not coincide so that no synchronisation is achieved. The signal during the field scan period is an analog video signal which does not contain any information regarding the clock pulses. In addition the direct voltage component of the combined signal has been lost during transmission while this direct voltage component is indispensable for the detection of the code words. In the synchronized state the direct voltage component in clamping circuit 29 is restored with the aid of keying pulse C originating from time base 18. However, as long as synchronisation is not achieved, the keying pulses C will not occur at the correct instants and will not correctly restore the direct voltage component during the field scan period because they may then coincide with the video signal. However, when the first lines of the field flyback period are filled with a signal which is more or less constant on the line and when each field is the same, the clamping circuit 29 may run in on this during the on synchronisation period. According to the principle of the invention the signal R is therefore provided during the said long period preceding the code words $CO_1$ and $CO_2$, firstly to give the clamping circuit 29 the opportunity to determine the direct voltage component at its correct value and secondly to ensure that the code word detector 19 is keyed in the correct manner. When the clock pulse generator 39 is synchronized in the correct manner, the code words $CO_1$ and $CO_2$ may be detected by the code word detector 19 and a pulse will occur at the output 48 when the code word $CO_1$ occurs and a pulse will occur at the output 49 when the code word $CO_2$ occurs. When the pulses derived from the outputs 48 and 49 have coincided with the pulses of signal I originating from time base 18 over a given minimum number of times, the synchronizing verification circircuit 20 provides a pulse for the output SYNC during at least one field period which pulse is applied to the inputs of AND-gate 5 and switch 31, respectively, so that these gates will pass the sound signal and the video signal, respectively, to the relevant parts of the receiver. With this it is achieved that these parts only receive a signal when there is sufficient certainty regarding the on-synchronizing state.

The signal I originating from the output I will, however, only coincide with the signals originating from outputs 48 and 49 when the divider stages 43, 44 and 45 from block 40 of the receiver synchronously share the clock pulse signal with the stages 43, 44 and 45 from the associated transmitter. In fact, as has been described, it is necessary to synchronize on two frequencies derived from the incoming signal, namely on the clock pulse frequency by the circuit 17 and on the field frequency with the aid of the field code word after division of the clock pulse frequency. Since division cannot be effected without phase ambiguity, it must be verified whether these divider stages actually provide the correct frequency in the correct phase. Consequently, when the pulse from output I does not coincide with the respective pulses at the outputs 48 and 49, the outputs 50 and 52 of the synchronizing verification circuit 20 will pass pulses to the inputs 53 and 54 of block 40 at the receiver end which reset the divider stages 43, 44 and 45 so that from now on the pulse from output I coincides with the respective pulses from outputs 48 and 49 so that synchronisation is achieved between transmitter and receiver. As long as the synchronising verification circuit decides that synchronisation between transmitter and receiver has not been established, a signal ACQUI is provided which continuously maintains gate 15 open. As soon as synchronisation is reached, the synchronisation verification circuit applies a signal to output SYNC which is the logically inverted signal of signal ACQUI and thus closes gate 15 and also opens gates 5 and 31. In that case signal A from time base 18 has the correct phase to open the AND-gate 14 so that the incoming signal R reaches the synchronizing circuit 17 exclusively during the part $\alpha\tau$ of the line flyback period $\tau$ through the AND-gate 14 and the OR-gate 16. As FIG. 2 shows, the output of limiter 35 is directly connected to the code word detector 19 so that during each field flyback period one of the code words $CO_1$ or $CO_2$ is compared with the signal originating from the output I. Consequently, as soon as an off-synchronizing state occurs, phase equality between the respective signals at the outputs 48 and 49 with those at output I is no longer present and the signal ACQUI will appear again so that again a synchronizing state is sought.

Furthermore FIG. 2 shows that the synchronizing circuit 17 includes a smoothing network 37 which ensures a satisfactory flywheel operation. This may be fruitfully utilized by not co-transmitting the signal R during each line flyback period $\tau$ and particularly during the portion $\alpha\tau$ as is shown in FIG. 5. For example, this signal R may be transmitted every other line flyback period and other signals may be transmitted during the remaining line flyback periods which signals serve, for example, for the synchronisation of a subcarrier generator for generating a subcarrier signal in the case where the videophone system transmits a coloured image.

It is to be noted that the provision of the signal R during the field flyback period with the associated code words $CO_1$ and $CO_2$ is independent of the signals which are transmitted during the line flyback period. In fact, whether information regarding the line synchronisation is transmitted during each line flyback period or is not transmitted, the run-in, i.e., acquisition problem remains present in the chosen digital-to-analog system.

Finally it is to be noted that instead of using the clamping circuit 29, which serves inter alia for determining the direct voltage component during the field flyback period when running in or reaching the on-synchronizing state is concerned, it is alternatively possible to use a highpass filter which filters out the signal R independently of the direct voltage level of the incoming signal in such a manner that it can be applied to the synchronizing circuit 17. The main problem of running in is the presence of signal R during the field flyback period for deriving the direct voltage level on the one hand and for causing the circuit 17 to reach the on-synchronizing state on the other hand. Once the correct synchronisation has been established, the sound signal can also be released. In fact, as is shown in FIG. 5, the sound signal G is transmitted during the portion $\alpha\tau$ of the line flyback period $\tau$. This sound signal is established at the transmitter end as follows. The signal derived from the microphone 1 is passed on or not passed on in the speech switch 2. The speech switch 2 is provided with an input 60 which is connected through a comparison circuit not shown to the input 61 of the speech switch 8 in the same videophone unit, that is to say, of the own receiver. The intensity of the signal provided by loudspeaker 9 is compared so as to find out whether it is larger than the intensity of the sound signal coming in through the microphone 1 and independently thereof the switch 2 is opened or closed. In fact, this is necessary in loudspeaking telephone systems likewise as in the present system because there is no telephone receiver as in the common telephone set but a separate microphone and a separate loudspeaker so that the risk of acoustic feedback increases considerably.

The signal from speech switch 2 is applied to the delta modulator 3 which is sampled by means of the signal S originating from time base 11. Therefore a delta-modulated signal is produced at the output of the stage 3 which signal is compressed in time in the eight-bit buffer memory 4 which is written in and read out by means of the signal W. Consequently it is possible to transmit the entire sound information associated with one line period during the short period $\beta\ \tau$.

The opposite is effected at the receiver end. The receiving signal G is expanded in time in the eight-bit buffer memory 6, subsequently demodulated in delta demodulator 7 and finally it reaches the loudspeaker 9 through the speech switch 8. Therefore the signals W and S are also necessary in this case for time expansion and demodulation, respectively. If there were no synchronisation between the clock pulse frequencies of transmitter and receiver, expansion as well as demodulation could not be established in the correct manner.

As regards the transmitter the following is to be noted. The input 62 of the camera 21 serves for focussing the objective lens of this camera and for giving the camera itself the correct direction. As already noted hereinbefore, this is necessary to ensure from the commencement of the communication that the camera is adjusted in the correct manner.

Furthermore the following applies to the receiver section. The video amplifier 32 receives two signals C and N from the time base 18. The signal N is the overall video blanking by which it is ensured in stage 32 that video information is not applied to the display tube 33 during the line flyback period and the field flyback period. The signal C is a clamping pulse which can ensure together with a clamping circuit present in amplifier 32 that the direct voltage level in the signal is again introduced, if necessary. The deflection circuit 34 receives the signals $\overline{D}$ and $\overline{K}$ which, as is shown in table I, represent the logically inverted line flyback pulses and the logically inverted field flyback pulses, respectively. These ensure that the correct currents flow through the deflection coils of the display tube 33 through the deflection circuit 34. In this manner it is achieved that the deflection in the display tube 33 is effected synchronously with the deflection in camera 21.

An additional advantage of the described system is that during running in the clock pulse synchronisation will be automatically correct and that a so-called "side phase lock" state cannot occur.

In fact, in an on-synchronizing state the synchronisation must be maintained with the aid of the pulsatory signal R which is transmitted during the part $\alpha\ \tau$ of the line flyback period $\tau$. However, this means that these pulses are transmitted in pieces having a repetition frequency which is equal to the line frequency (transmission during each line flyback period) or part thereof (transmission during every second or third line flyback period). If the repetition frequency of the clock pulses themselves is $f_b$ and the repetition frequency at which the pieces of these pulses are transmitted is $\delta$ fh ($\delta$ = 1, ½, ⅓ and fh = line frequency) the frequencies $f_b \pm \delta f h$ are also present in the signal. In other words the transmitted pieces of pulses may be considered as a pulse-modulated carrier. However, it follows therefrom that synchronisation can be established not on the frequency $f_b$ itself but on a frequency $f_b + \delta f_h$ or $f_b - \delta f_h$. However, if such a "side phase lock" state should occur this means that the repetition frequency of the clock pulses at the transmitter end differs from that at the receiver end. As a result the signal I will not coincide with the detection instant through the word detector 19 of the next code word so that the signals indicating that an on-synchronising state has been reached will not occur at the outputs 50 and 52 of the synchronisation verification circuit 20. The system therefore continues to detect until the clock pulse generator 39 is synchronized on the frequency $fb$.

What is claimed is:

1. A transmitter comprising means for transmitting a line and field scanned signal video in analogue form; a clock pulse generator means for generating clock pulses; a code word generator coupled to said clock pulse generator for generating field code words during field flyback period; means for transmitting a digital synchronizing signal with said video signal during at least part of a line scan period of said video signal commencing after the start of a field flyback period and ending upon the generation of a field code word by said field code generator; whereby a receiver synchronizing circuit is ensured of proper synchronization with said transmitter.

2. A transmitter as claimed in claim 1 further comprising means for ensuring that said clock pulses and said code word are digitally transmitted during the field flyback periods and that said video signal is transmitted in analogue form during the line and field scan periods.

3. A transmitter as claimed in claim 1 further comprising delta modulation means for transmitting audio signal.

4. A receiver for a composite signal having a line and field scanned analogue video component, a digital clock component a digital field code word component during the field flyback period, and a digital synchronization component transmitted during at least part of a line scan period commencing after the beginning of a field flyback period and ending upon the occurrence of said field code word; said receiver comprising code word detector means adapted to receive said transmitted code words and for dupplying same; a clock pulse generator means; and means coupled to said clock generator and adapted to receive said synchronization signal for synchronizing said generator.

5. A receiver as claimed in claim 4 wherein said composite signal further has an audio delta modulation signal and said receiver further comprises means adapted to receive said delta modulation signal and for supplying the original audio signal.

6. A receiver as claimed in claim 4 wherein said clock and code word components are transmitted during field flyback periods and said video signal is transmitted during line and field scan periods, said receiver further comprising means adapted to receive said clock signal for restoring the direct voltage component of said transmitted signal during a field flyback period before receiving the particular field code word.

7. A receiver as claimed in claim 6 wherein said restoring means comprises a clamp circuit.

8. A receiver as claimed in claim 6 wherein said restoring means comprises a high pass filter.

* * * * *